US006246682B1

(12) United States Patent
Roy et al.

(10) Patent No.: US 6,246,682 B1
(45) Date of Patent: Jun. 12, 2001

(54) METHOD AND APPARATUS FOR MANAGING MULTIPLE ATM CELL QUEUES

(75) Inventors: Subhash C. Roy, Stamford; Eugene L. Parrella, Shelton; Ian Ramsden, Woodbury, all of CT (US)

(73) Assignee: Transwitch Corp., Shelton, CT (US)

( * ) Notice: Subject to any disclaimer, the term of this patent is extended or adjusted under 35 U.S.C. 154(b) by 0 days.

(21) Appl. No.: 09/263,289

(22) Filed: Mar. 5, 1999

(51) Int. Cl.[7] .................................................... H04L 12/28
(52) U.S. Cl. ........................................... 370/390; 370/395
(58) Field of Search .................................... 370/235, 392, 370/394, 395, 397, 401, 412, 413, 414, 419, 375, 428, 429, 389, 390

(56) References Cited

U.S. PATENT DOCUMENTS

| | | | |
|---|---|---|---|
| 5,123,101 | 6/1992 | Sindhu | 395/400 |
| 5,130,975 | 7/1992 | Akata | 370/60 |
| 5,390,175 | 2/1995 | Hiller et al. | 370/60 |
| 5,521,916 | * 5/1996 | Choudhury et al. | 370/414 |
| 5,530,806 | 6/1996 | Condon et al. | 395/185.02 |
| 5,535,197 | * 7/1996 | Cotton | 370/414 |
| 5,550,821 | 8/1996 | Akiyoshi | 370/60.1 |
| 5,555,244 | 9/1996 | Gupta et al. | 370/60.1 |
| 5,636,210 | 6/1997 | Agrawal | 370/390 |
| 5,654,962 | 8/1997 | Rostoker | 370/232 |
| 5,689,500 | * 11/1997 | Chiussi et al. | 370/235 |
| 5,745,489 | * 4/1998 | Diaz et al. | 370/395 |
| 5,774,465 | 6/1998 | Lau et al. | 370/397 |
| 5,893,162 | 4/1999 | Lau et al. | 711/153 |

OTHER PUBLICATIONS

"A Mutli–queue flexible buffer manager architecture", Valamuri, Landsberg & Zukowski, 1993, IEEE,pp 1401–1410.
Doctoral paper,VLSI for packet switching nodes in communications networks, Paul Landsberg, Columbia University, 1993, 222 pages.
Article "622 Mb/s 8×8 Shared multibuffer ATM switch with hierarchical queueing and multicast functions", by Yamanaka, 1999, IEEE,pp1488–1495.

* cited by examiner

Primary Examiner—Chau Nguyen
Assistant Examiner—Chiho Andrew Lee
(74) Attorney, Agent, or Firm—David P. Gordon; David S. Jacobson; Thomas A. Gallagher

(57) ABSTRACT

Methods for managing multiple queues of ATM cells in shared RAM while efficiently supporting multicasting include providing a common memory for storing ATM cells and for storing at least one pointer to each ATM cell stored, providing a management memory for storing an index to the pointers stored in common memory, a table for each multicast session, and an index to the free space in common memory. According to the presently preferred method, cells entering the switch are examined, placed in shared RAM, and a pointer to the RAM location is written in another location in the shared RAM. Table entries in management RAM are updated each time a cell is added to a queue. When a multicast session is begun, a multicast table is created with all of the addresses in the multicast session. When a multicast cell is received, the multicast session table is consulted and pointers to the cell are copied to queues for each address in the table. When a pointer exits a queue, the cell pointed to by the pointer is read and transmitted to the address of the queue. As the cell is read, the destination count for the cell is decremented. When the destination count is reduced to zero, the RAM location used to store the cell is added to the free list. Each time a pointer is read, the table entry for the affected queue is updated. When the queue becomes empty, an active bit in the table entry is toggled.

26 Claims, 12 Drawing Sheets

| WORD/BIT | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0 | SWITCH SPECIFIC PARAMETERS ||||||||||||||||||||||||||||||||
| 1 |  ||||||||||||||||||||||||||||||||
| 2 | DATA PAYLOAD ||||||||||||||||||||||||||||||||
| 3 |  ||||||||||||||||||||||||||||||||
| 4 |  ||||||||||||||||||||||||||||||||
| 5 |  ||||||||||||||||||||||||||||||||
| 6 |  ||||||||||||||||||||||||||||||||
| 7 |  ||||||||||||||||||||||||||||||||
| 8 |  ||||||||||||||||||||||||||||||||
| 9 |  ||||||||||||||||||||||||||||||||
| 10 |  ||||||||||||||||||||||||||||||||
| 11 |  ||||||||||||||||||||||||||||||||
| 12 |  ||||||||||||||||||||||||||||||||
| 13 |  ||||||||||||||||||||||||||||||||
| 14 |  ||||||||||||||||||||||||||||||||
| 15 | COUNT ||||||||||||||||||||||||||||||||

FIG.4

| WORD/BIT | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0 | POINTER TO CELL #1 | | | | | | | | | | | | | | | | | | | | | | | | | | | | | | | |
| 1 | POINTER TO CELL #2 | | | | | | | | | | | | | | | | | | | | | | | | | | | | | | | |
| 2 | POINTER TO CELL #3 | | | | | | | | | | | | | | | | | | | | | | | | | | | | | | | |
| 3 | POINTER TO CELL #4 | | | | | | | | | | | | | | | | | | | | | | | | | | | | | | | |
| 4 | POINTER TO CELL #5 | | | | | | | | | | | | | | | | | | | | | | | | | | | | | | | |
| 5 | POINTER TO CELL #6 | | | | | | | | | | | | | | | | | | | | | | | | | | | | | | | |
| 6 | POINTER TO CELL #7 | | | | | | | | | | | | | | | | | | | | | | | | | | | | | | | |
| 7 | POINTER TO CELL #8 | | | | | | | | | | | | | | | | | | | | | | | | | | | | | | | |
| 8 | POINTER TO CELL #9 | | | | | | | | | | | | | | | | | | | | | | | | | | | | | | | |
| 9 | POINTER TO CELL #10 | | | | | | | | | | | | | | | | | | | | | | | | | | | | | | | |
| 10 | POINTER TO CELL #11 | | | | | | | | | | | | | | | | | | | | | | | | | | | | | | | |
| 11 | POINTER TO CELL #12 | | | | | | | | | | | | | | | | | | | | | | | | | | | | | | | |
| 12 | POINTER TO CELL #13 | | | | | | | | | | | | | | | | | | | | | | | | | | | | | | | |
| 13 | POINTER TO CELL #14 | | | | | | | | | | | | | | | | | | | | | | | | | | | | | | | |
| 14 | POINTER TO CELL #15 | | | | | | | | | | | | | | | | | | | | | | | | | | | | | | | |
| 15 | POINTER TO NEXT BLOCK OF POINTERS | | | | | | | | | | | | | | | | | | | | | | | | | | | | | | | |

FIG.5

| WORD/BIT | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0 | A | | | | | | | | | | TAIL POINTER FOR QLF #1 | | | | | | | | | | | | | | | | | | | | | |
| 1 | | | | | | | | CELL COUNT FOR QLF #1 | | | | | | | | | | | | | | | QUEUE LIMIT FOR QLF #1 | | | | | | | | | |
| 2 | | | | | | | | | | | HEAD POINTER FOR QLF #1 | | | | | | | | | | | | | | | | | | | | | |
| 3 | A | | | | | | | | | | TAIL POINTER FOR QLF #2 | | | | | | | | | | | | | | | | | | | | | |
| 4 | | | | | | | | CELL COUNT FOR QLF #2 | | | | | | | | | | | | | | | QUEUE LIMIT FOR QLF #2 | | | | | | | | | |
| 5 | | | | | | | | | | | HEAD POINTER FOR QLF #2 | | | | | | | | | | | | | | | | | | | | | |
| 6 | A | | | | | | | | | | TAIL POINTER FOR QLF #3 | | | | | | | | | | | | | | | | | | | | | |
| 7 | | | | | | | | CELL COUNT FOR QLF #3 | | | | | | | | | | | | | | | QUEUE LIMIT FOR QLF #3 | | | | | | | | | |
| 8 | | | | | | | | | | | HEAD POINTER FOR QLF #3 | | | | | | | | | | | | | | | | | | | | | |
| 9 | A | | | | | | | | | | TAIL POINTER FOR QLF #4 | | | | | | | | | | | | | | | | | | | | | |
| 10 | | | | | | | | CELL COUNT FOR QLF #4 | | | | | | | | | | | | | | | QUEUE LIMIT FOR QLF #4 | | | | | | | | | |
| 11 | | | | | | | | | | | HEAD POINTER FOR QLF #4 | | | | | | | | | | | | | | | | | | | | | |
| 12 | A | | | | | | | | | | TAIL POINTER FOR QLF #5 | | | | | | | | | | | | | | | | | | | | | |
| 13 | | | | | | | | CELL COUNT FOR QLF #5 | | | | | | | | | | | | | | | QUEUE LIMIT FOR QLF #5 | | | | | | | | | |
| 14 | | | | | | | | | | | HEAD POINTER FOR QLF #5 | | | | | | | | | | | | | | | | | | | | | |
| 15 | | | | | | | | | | | POINTER TO NEXT TABLE | | | | | | | | | | | | | | | | | | | | | |

FIG.6

| WORD/BIT | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0 | | | | | | | | | | | | | | | | | | | | | | | | | | | | DEST # | | | | |
| 1 | QID #2 | | | | | | | | | | | | | | | | QID #1 | | | | | | | | | | | | | | | |
| 2 | QID #4 | | | | | | | | | | | | | | | | QID #3 | | | | | | | | | | | | | | | |
| 3 | QID #6 | | | | | | | | | | | | | | | | QID #5 | | | | | | | | | | | | | | | |
| 4 | QID #8 | | | | | | | | | | | | | | | | QID #7 | | | | | | | | | | | | | | | |
| 5 | QID #10 | | | | | | | | | | | | | | | | QID #9 | | | | | | | | | | | | | | | |
| 6 | QID #12 | | | | | | | | | | | | | | | | QID #11 | | | | | | | | | | | | | | | |
| 7 | QID #14 | | | | | | | | | | | | | | | | QID #13 | | | | | | | | | | | | | | | |
| 8 | QID #16 | | | | | | | | | | | | | | | | QID #15 | | | | | | | | | | | | | | | |
| 9 | QID #18 | | | | | | | | | | | | | | | | QID #17 | | | | | | | | | | | | | | | |
| 10 | QID #20 | | | | | | | | | | | | | | | | QID #19 | | | | | | | | | | | | | | | |
| 11 | QID #22 | | | | | | | | | | | | | | | | QID #21 | | | | | | | | | | | | | | | |
| 12 | QID #24 | | | | | | | | | | | | | | | | QID #23 | | | | | | | | | | | | | | | |
| 13 | QID #26 | | | | | | | | | | | | | | | | QID #25 | | | | | | | | | | | | | | | |
| ... | ... | | | | | | | | | | | | | | | | ... | | | | | | | | | | | | | | | |
| n | QID #2n | | | | | | | | | | | | | | | | QID #2n−1 | | | | | | | | | | | | | | | |

FIG. 7

METHOD AND APPARATUS FOR MANAGING MULTIPLE ATM CELL QUEUES

BACKGROUND OF THE INVENTION

1. Field of the Invention

The invention relates to Asynchronous Transfer Mode (ATM) telecommunications switching. More particularly, the invention relates to a method and apparatus for managing multiple ATM cell queues in a common memory where some of the ATM cells are to be multicast.

2. State of the Art

ATM switches typically include multiple buffers, queues, or FIFOs for managing the flow of ATM cells through the switch. The buffers may be at the entry to the switch, at the exit to the switch, or between the entry and the exit of the switch. It is known from co-owned allowed application Ser. No. 08/796,085 to utilize a common memory (RAM) in which multiple queues are realized. The method used for managing multiple queues in a common RAM is known as "link list". According to the link list method of buffer management, each data element in a particular queue includes a pointer to the next consecutive element in the queue, thereby allowing a multiple queues (link lists) to be fragmented throughout a common RAM. For example, as shown in FIG. 11, a single block of RAM may contain "N" number of queues as link lists #1, #2, . . . #N. Each list may contain "n" number of data elements which are stored in the RAM in a non-contiguous manner. In order for each data element in a list to be properly associated with the other elements in the list, each element includes, in addition to the "m" number of contiguously stored words in the element, a pointer to the physical address in RAM of the next element in the list. As shown in connection with the second element of list #N in FIG. 11, elements other than the first element in the list also include a pointer to the physical address in RAM of the previous element in the list. The pointer to the previous element is used for testing or for the implementation of a LIFO buffer rather than the typical FIFO buffer.

The link list queues are managed by another list such as that shown in FIG. 12 wherein for each queue (link list), three parameters are maintained: the memory address of the first data element in the queue (head pointer), the memory address of the last data element in the queue (tail pointer), and the depth of the queue (counter). In addition, a list of free space (free list) in RAM is also maintained by storing a head pointer, a tail pointer, and a counter for the unused blocks of RAM which are available for use in queuing data elements. It will be appreciated that the unused blocks of RAM, which are not necessarily contiguous, are indexed with previous and next pointers just as the used blocks are. In this manner, multiple queues may be set up, torn down, and managed in a single common memory.

One of the desirable features of ATM is its support for multicast data transmission. Multicast data transmission is particularly useful in efficiently implementing conference calls. One method of implementing multicasting is discussed in the previously incorporated U.S. Pat. No. 5,774,465. In general, each ATM cell which is to be multicast is copied multiple times with a different address header for each copy. In an ATM switch which utilizes discrete hardware queues at the exit of the switch, the multicast cell is copied to multiple queues. In a switch utilizing link list queues at the entrance to the switch, multicasting may be more complicated.

One simple method for managing multicasting in a link list system is analogous to the method described above, i.e., each multicast data element is copied to multiple link lists. This method is easy to implement, but it makes inefficient use of the memory used to implement the queues. A possible solution to managing multicasting in a link list system is to increase the overhead for each data element in the link lists. According to this method, each data element would be provided with a header which includes information about the multiple addresses to which the data element is to be multicast. This would make more efficient use of data storage since it would not be necessary to store multiple copies of the same data. However, management of the multicast data elements with expanded header information would be complex since the status of each multicast transmission must be constantly monitored and updated. It would be very difficult to determine when all the necessary copies of the multicast cell have been sent and thus when cell buffer space can be freed. Further, as the number of multicast destinations increases, the amount of overhead per data element may exceed the size of the data element.

SUMMARY OF THE INVENTION

It is therefore an object of the invention to provide a method and apparatus for managing multiple ATM queues in a common memory.

It is also an object of the invention to provide a method and apparatus for managing multiple ATM queues in a common memory and which supports multicasting.

It is another object of the invention to provide a method and apparatus for managing multiple ATM queues in a common memory which supports multicasting and which makes efficient use of memory.

It is still another object of the invention to provide a method and apparatus for managing multiple ATM queues in a common memory, which supports multicasting, which makes efficient use of memory, and which is easily implemented.

In accord with these objects which will be discussed in detail below, the apparatus of the present invention includes a common memory for storing ATM cells and for storing at least one pointer to each ATM cell stored, wherein the pointers are kept in a plurality of linked lists in order to establish a plurality of queues, and a management memory for storing an index to the pointers stored in common memory, a table for each multicast session, and an index to the free space in common memory.

According to the presently preferred embodiment of the invention, the common memory is apportioned in blocks of sixty-four bytes (sixteen thirty-two bit words) for cell storage and pointer storage. Each ATM cell is stored in a single block together with some switch specific overhead and a one word count of the number of destinations waiting for the cell (i.e., the number of queues of which the cell is a part). The pointers which are kept in link lists in order to define queues, are also stored in contiguous sixty-four byte blocks which contain fifteen pointers and an additional word pointing to the next block of fifteen pointers. All of the pointers in a queue are indexed with a table entry (in management memory) which includes the addresses of the first and last pointers, a count of the number of cells in the queue, the queue limit (i.e., maximum queue size), and an indication of whether the queue is active. According to the presently preferred embodiment, each multicast session table in management memory includes a five bit counter indicating the total number of addresses in the multicast session and a list of each of the addresses. However, the counter could be a full 32-bit word.

The method of the present invention includes storing ATM cells in blocks common memory, with each ATM cell accompanied by a one word count of the number of destinations waiting for the cell, and storing pointers to the ATM cells as link lists. The pointers are stored in contiguous blocks, each block having a tail pointer to the next contiguous block of pointers. The method of the invention also includes organizing an index to each link list of pointers as a table entry, with each entry containing information about the first and last pointer referring to a queue of data elements; and for each multicast session, maintaining a list of all of the queues involved in the session.

According to the presently preferred method, cells entering the switch are examined, placed in shared RAM, and a pointer to the RAM location is written in another location in the shared RAM. Table entries in management RAM are updated each time a cell is added. When a multicast session is begun, a multicast table is created with all of the addresses in the multicast session. When a multicast cell is received, the multicast session table is consulted and pointers to the cell are copied to each destination link list of pointers; thereby effectively incorporating that cell in multiple queues. When a pointer exits a queue (i.e., "pops"), the cell pointed to by the pointer is read and transmitted to the address of the queue. As the cell is read, the destination count for the cell is decremented. When the destination count is reduced to zero, the RAM location used to store the cell is added to the free list. Each time a pointer is read, the table entry for the affected queue is updated. When the queue is no longer needed, the active bit in the table entry is toggled. The active bit serves to distinguish an empty queue which is awaiting input from an empty queue which is no longer needed.

Additional objects and advantages of the invention will become apparent to those skilled in the art upon reference to the detailed description taken in conjunction with the provided figures.

BRIEF DESCRIPTION OF THE DRAWINGS

FIG. 4 is a diagram of a sixteen word memory block used to storing ATM cells in shared memory;

FIG. 5 is a diagram of a sixteen word memory block used to store pointers to ATM cells;

FIG. 6 is a diagram of a sixteen word block of management memory used to identify queues;

FIG. 7 is a diagram of a sixteen word block of management memory used to identify the addresses in a multicast session;

DETAILED DESCRIPTION OF THE PREFERRED EMBODIMENTS

For purposes of understanding the invention, the detailed description is referenced to specifically being carried out in the context of an ATM switch, e.g., in the physical layer VLSI portion of an ATM destination switch. The apparatus of previously incorporated co-owned U.S. Patents can be utilized to implement the present invention. Preferably, an apparatus of the type shown in FIG. 1 may be used to implement the invention.

Figure 1:
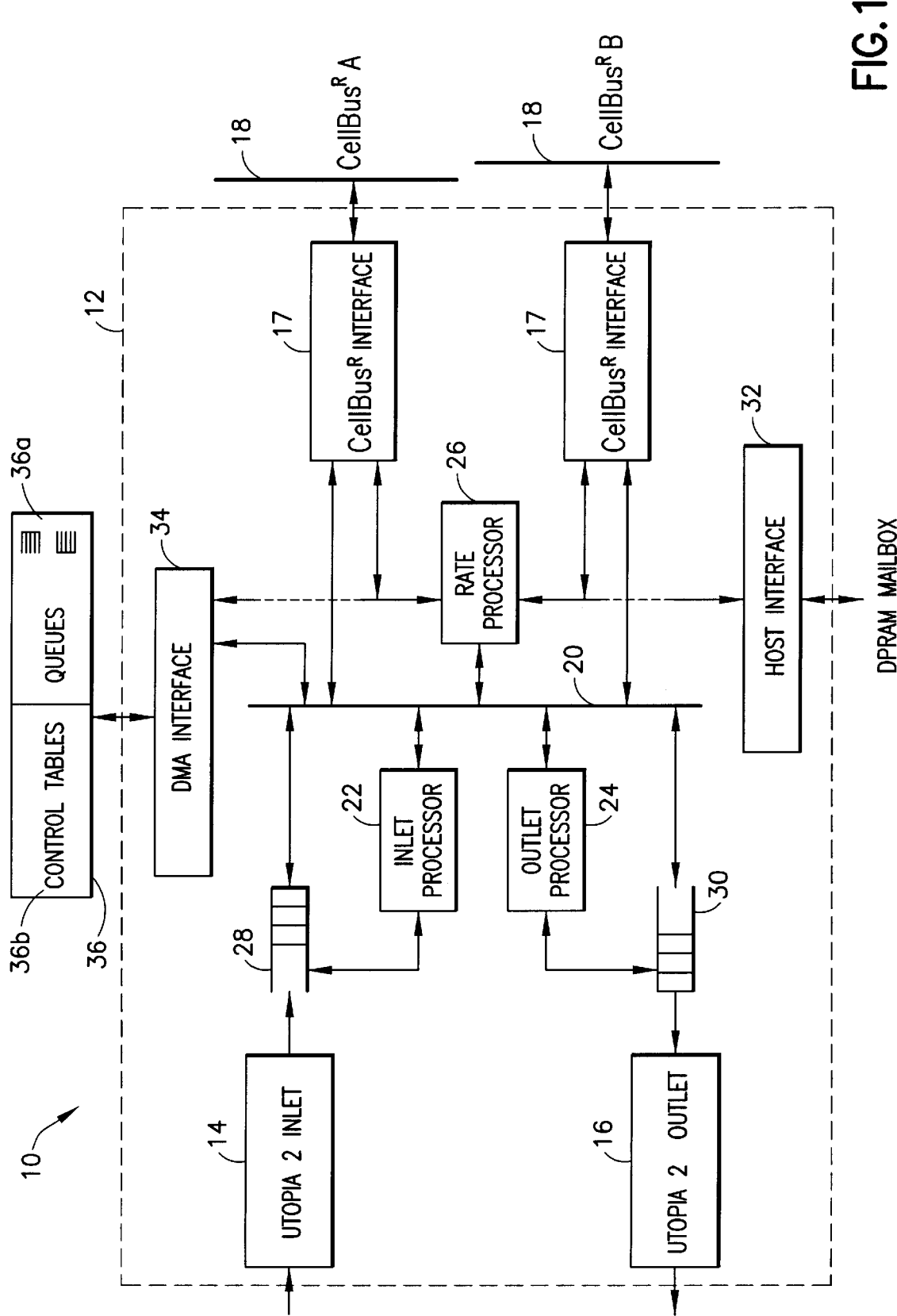
FIG. 1 is a block diagram of an apparatus for implementing the method of the invention.

The device 10 shown in FIG. 1 includes an ATM switch interface 12 which processes ATM cells entering or leaving an ATM switch. As such, the interface 12 is coupled to a UTOPIA interface (not shown) via UTOPIA inlet 14 and UTOPIA OUTLET 16 and via interfaces 17 to the switch 18. As shown in FIG. 1, the switch is the proprietary shared bus system of the applicant's assignee sold under the trademark CELLBUS®. Those skilled in the art will appreciate from the following detailed description that the invention may be practiced with other shared bus architectures or with a conventional switch fabric. It will also be appreciated that in an ATM switch, several of the devices 12 will be coupled to the switch 18 and that the UTOPIA interfaces will be used to couple the switch to subscriber lines and to the network. This particular device 12 will be sold by the applicant's assignee under the trademark ASPEN™ and will be used as a component in building ATM switches.

The device 12 has an internal bus 20 and three RISC processors 22, 24, 26 which are all coupled to the internal bus 20. The inlet processor 22 is coupled to a small inlet buffer 28 which lies between the UTOPIA inlet 14 and the internal bus 20. The outlet processor 24 is coupled to a small outlet buffer 30 which lies between the internal bus 20 and the UTOPIA outlet 16. Each of the processors is programmable via a host interface 32 which may also be used to collect statistics about traffic through the device 12. A DMA interface 34 is provided for coupling the device 12 to an external RAM 36. As will be described in more detail below, the RAM 36 includes a shared RAM portion 36a which stores data and queues of pointers and a management RAM portion 36b which is used to manage the shared RAM.

The flow of data through the device 12 is substantially as follows. The data enters UTOPIA inlet 14 and into the small buffer 28. The inlet processor 22 routes the cells or packets to the appropriate queues in the RAM 36 via the bus 20 and the DMA interface 34. The rate processor 26 dequeues the cells or packets from the RAM 36 and places them on the shared bus (or switch fabric) 18. Data from other devices 12 in the ATM switch are taken off the shared bus 18 by the rate processor and forwarded via the internal bus 20 to the small outlet buffer 30 where they are dequeued by the outlet processor 24 to the UTOPIA outlet 16.

Figure 2:
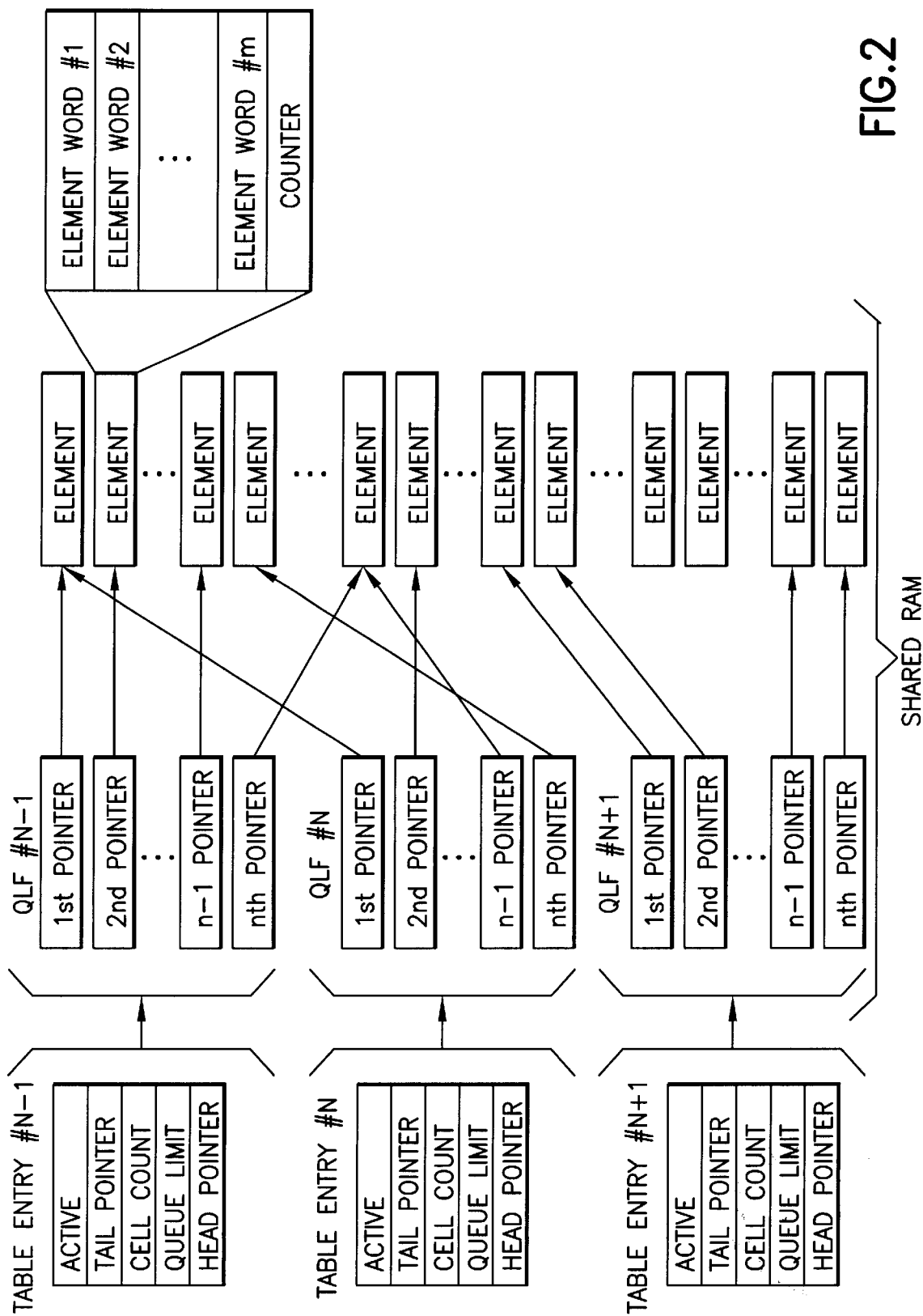
FIG. 2 is a schematic diagram of how the shared memory and management memory of FIG. 1 are organized according to the invention.

Referring now to FIG. 2, the present invention is broadly illustrated with reference to a list of elements, each data element having the same "m" number of words and a one word counter. As explained in more detail below, the counter indicates the number of destinations which should receive the data (e.g., for multicasting purposes). According to the invention, each of the words in a data element is stored in a contiguous space in shared RAM 36a so that the entire data element may be accessed via a single address. At least one pointer is provided for each data element (multiple pointers if the data element is to be multicast), and the pointers are stored as a plurality of link lists in another location of shared RAM. As explained in more detail below, the pointers are stored in contiguous blocks of RAM with a linking pointer to the next contiguous block of pointers relating to the same queue. A single link list of pointers to various elements is referred to by the trademark QUEUE LINK FIFO or the abbreviation QLF, as the linked list of pointers effectively establishes a queue (FIFO) of elements. As shown in FIG. 2, the number of pointers in a QLF establishes the number of data elements in a queue. However, as will be discussed in more detail below, pointers of different link lists can point to the same data element; i.e., a single data element may be in multiple queues. For example, as seen in FIG. 2, three different QLFs for generating three different queues are provided, and several of the elements in the element list are pointed to by more than one QLF; i.e., several elements are in more than one queue. As seen in FIG. 2, each QLF is indexed in management RAM 36b by a table entry which points to the QLF. According to a preferred embodiment, the table entry pointer to each QLF includes an indication of whether the QLF is "active", a tail pointer which points to the last pointer in the QLF, a cell count which indicates the total number of pointers in the QLF and thus the total number of data elements in the queue, a queue limit which indicates the maximum number of cells permitted in the queue, and a head pointer which points to the first pointer in the QLF.

Figure 3:
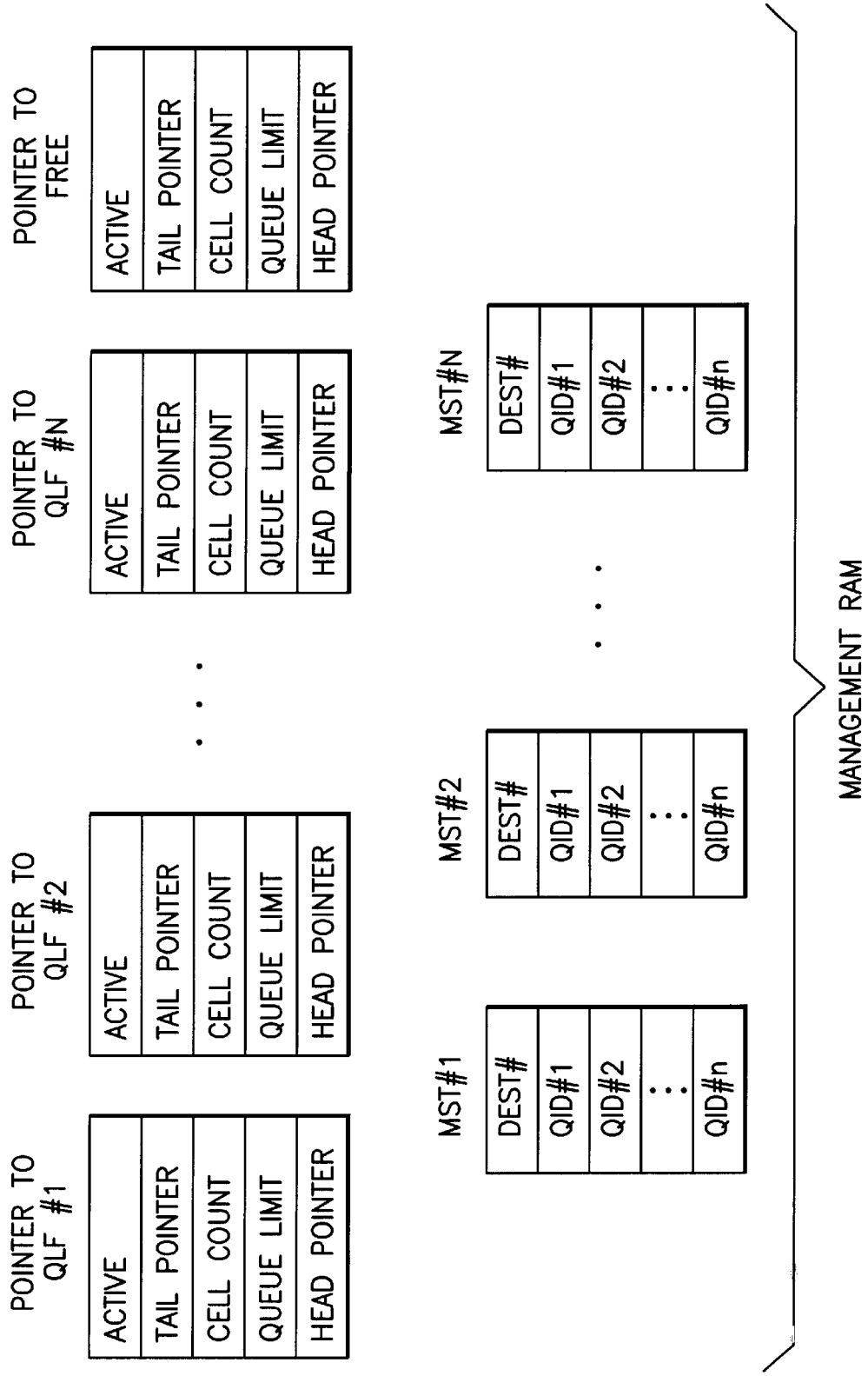
FIG. 3 is a schematic diagram of the contents of management memory according to the invention.

As mentioned above and as illustrated in FIG. 3, a table entry pointer for each QLF (QLF #1, QLF #2, ..., QLF #N) is stored in management RAM. In addition, a similar table entry pointer to the free space in shared RAM is also stored in the management RAM. Further, as described in more detail below, a multicast session table (MST) is maintained for each multicast session being managed by the invention.

According to the presently preferred embodiment of the invention, the shared RAM is apportioned in blocks of sixty-four bytes (sixteen thirty-two bit words) for cell storage and pointer storage. Each ATM cell (data element) is stored in a single block together with some switch specific overhead and a one word count of the number of destinations waiting for the cell. For example, as shown in FIG. 4, the first two words of a block of shared RAM are used for switch specific parameters, the next thirteen words are used for the data payload of an ATM cell, and the last word is used to indicate the number of destinations which should receive a copy of the cell.

Pointers to the cells in a queue are similarly stored in sixty-four byte blocks as shown in FIG. 5. Each block holds fifteen pointers and a pointer to the next block of fifteen pointers in a particular queue. For example, if there are forty-one cells in a queue, there will be forty-one pointers stored in three blocks of shared RAM. The first block will store the first fifteen pointers and will contain a pointer to the location of the memory block containing the second fifteen pointers; and the second block will store the next fifteen points and will contain a pointer to the location of the memory block containing the remaining eleven pointers.

From the foregoing, it will be appreciated that blocks of pointers to individual cells in a queue are stored in a manner which is similar to a link list. All of the pointers for each queue are indexed with a table entry which includes the addresses of the first and last pointers, a count of the number of cells in the queue, the queue limit, and an indication of whether the queue is active. The presently preferred table entry format is shown in FIG. 6 which illustrates indices to five queues in a sixty-four byte block of management RAM. According to one embodiment of the invention, however, the table entries are written to a reserved contiguous portion of management RAM and there is no need to link blocks of table entries as suggested in FIG. 6. The preferred table entry format includes a one bit active indicator "A" which can be quickly toggled to free up space in the table for new entries, a twenty-nine bit tail pointer to the pointer in shared RAM which points to the cell at the end of the queue, a sixteen bit counter for the number of cells presently residing in the queue, a sixteen bit number indicating the maximum number of cells which may be present in the queue at any given time, and a twenty-nine bit head pointer to the pointer in shared RAM which points to the cell at the beginning of the queue. According to the presently preferred embodiment, the table is indexed by queue number and sufficient resources are provided to manage sixty-four thousand queues (65,536) in shared RAM. In addition, a table entry similar to those shown in FIG. 6 is provided to point to the free blocks of shared RAM.

From the foregoing, those skilled in the art will appreciate that cells may be multicast by copying pointers to multiple QLFs and writing the appropriate count number to the last word ("count") of each memory block containing a multicast cell (see FIG. 4). However, some means must be provided to properly copy the pointers. According to the preferred embodiment of the invention, every time a multicast session is established, a multicast session table (MST) is created in management RAM. The MST is indexed to header information in cells which are part of the multicast session. According to the invention, as illustrated in FIG. 7, each MST has a five bit count (Dest #) of the number of destinations in the multicast session and a sixteen bit address (QID) for each multicast destination queue. As shown in FIG. 7, up to thirty multicast destinations may be listed in a single sixty-four byte table.

Figure 8:
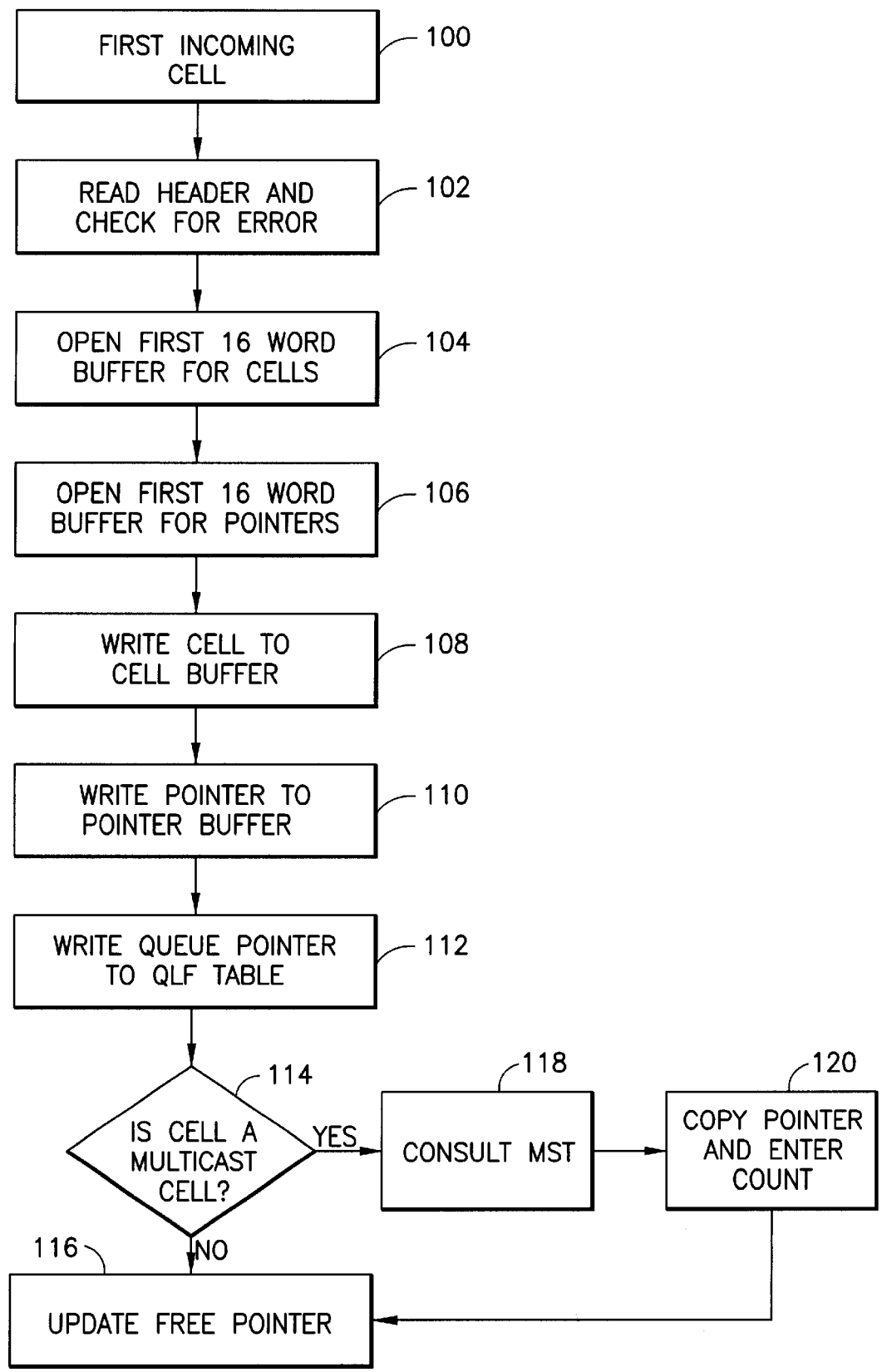
FIG. 8 is a simplified flow chart illustrating the initialization of a queue according to the invention.
Figure 9:
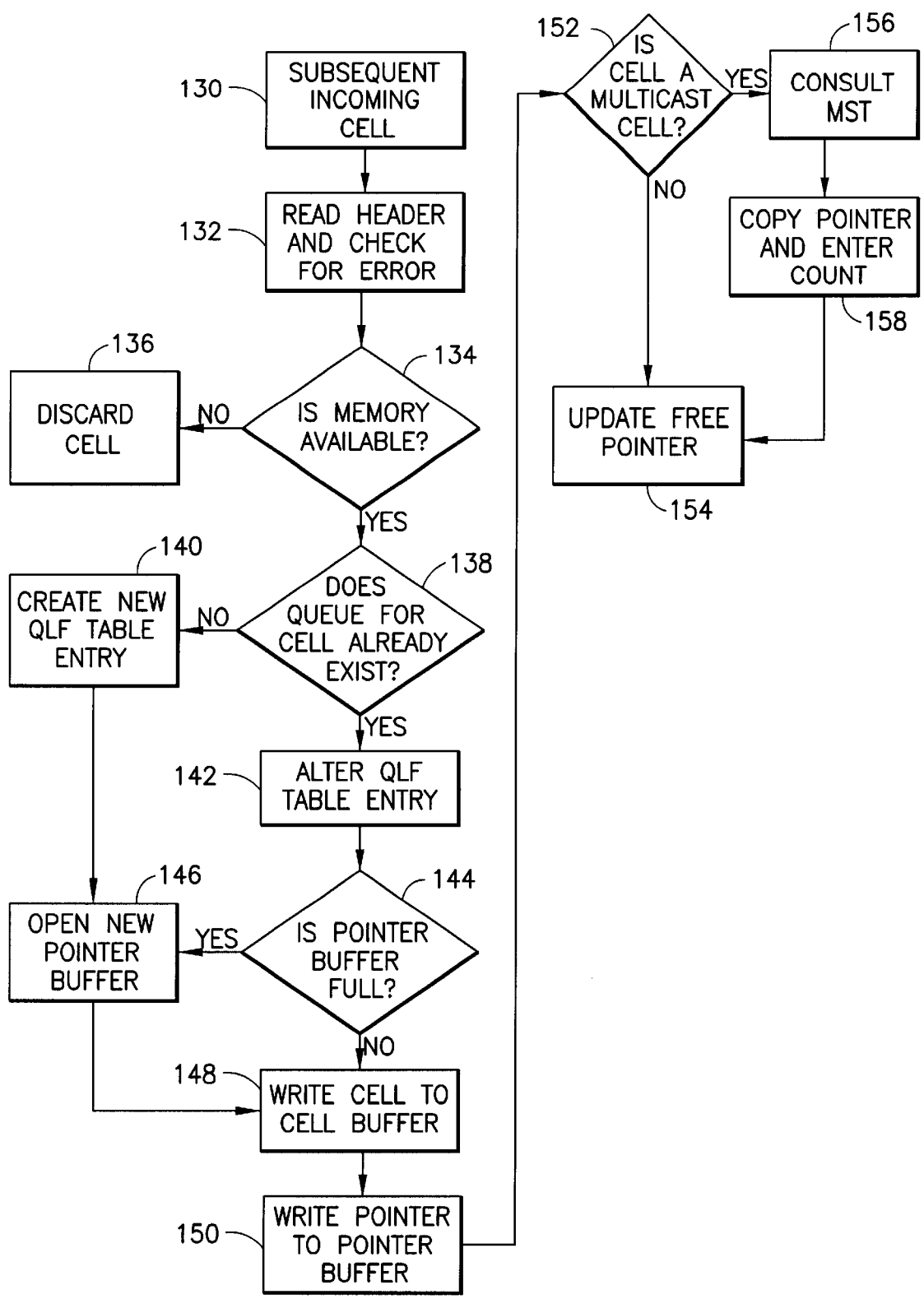
FIG. 9 is a simplified flow chart illustrating the handling of incoming cells after buffers have been initialized.

The method of the invention is further illustrated with reference to the flow charts of FIGS. 8–10. Turning now to FIG. 8, when a first incoming ATM cell enters the system at 100, the header is checked and the header protection word is stripped off at 102. Before the cell can be queued according to the methods of the invention, the operations shown in FIG. 8 must be performed, though not necessarily in the exact order as shown. A buffer (FIG. 4) for the cell is opened at 104 and a buffer (FIG. 5) for pointers to this cell and other cells destined for the same queue(s) is opened at 106. The cell is written to the cell buffer at 108 and a pointer to the address of the cell buffer is written to the pointer buffer at 110. A table entry (FIG. 6) is written to a location in management RAM at 112 indicating that the first queue has been opened. At some point in this process, e.g. at 114 in FIG. 8, it is determined whether the cell is a multicast cell. If it is not a multicast cell, the queuing of the incoming cell is complete and the free space pointer is updated at 116. If it is determined that the cell is part of a multicast session, the MST (FIG. 7) is consulted at 118. The pointer to the cell is copied to the QIDs listed in the MST, and the Dest# from the MST is copied to the count word in the cell buffer at 120 before updating the free memory pointer at 116.

Once buffers have been initialized, they must be managed as cells enter and leave the switch. FIG. 9 illustrates the management of buffers during the processing of incoming cells. An incoming cell is received at 130. The header of the incoming cell is checked at 132 and the header protection word (HEC) is preferably removed from the cell. Before the cell can be further processed, the operations shown in FIG. 9 are preferably performed, though not necessarily in the exact order as shown. In particular, it must be determined at 134 whether sufficient memory (shared RAM and management RAM) exists to process the cell. If not, the cell must be discarded at 136. It is also determined at 138 whether a queue already exists for this cell. If the cell does not already have a queue for its destination, a new QLF table entry is created in management RAM at 140 and a new pointer buffer is created in shared RAM at 146. If the cell is destined for an existing buffer, the existing QLF table entry is altered at 142. It is also determined at 144 whether the existing pointer buffer for the queue is full. If it is, a new pointer buffer is opened at 146 (with the address of the new pointer buffer being written to the last word of the old pointer buffer). At 148, the ATM cell is written (as an element) to the cell buffer and a pointer to the cell is written to the pointer buffer (QLF) at 150. At some point, e.g. at 152, it is determined whether the cell is a multicast cell. If it is not, the processing of the cell is concluded at 154 with the free space pointer being updated. If it is, the MST for the cell is consulted at 156 and pointers are copied to the destination queues listed in the MST and the Dest# from the MST is copied to the last word of the cell buffer.

Figure 10:
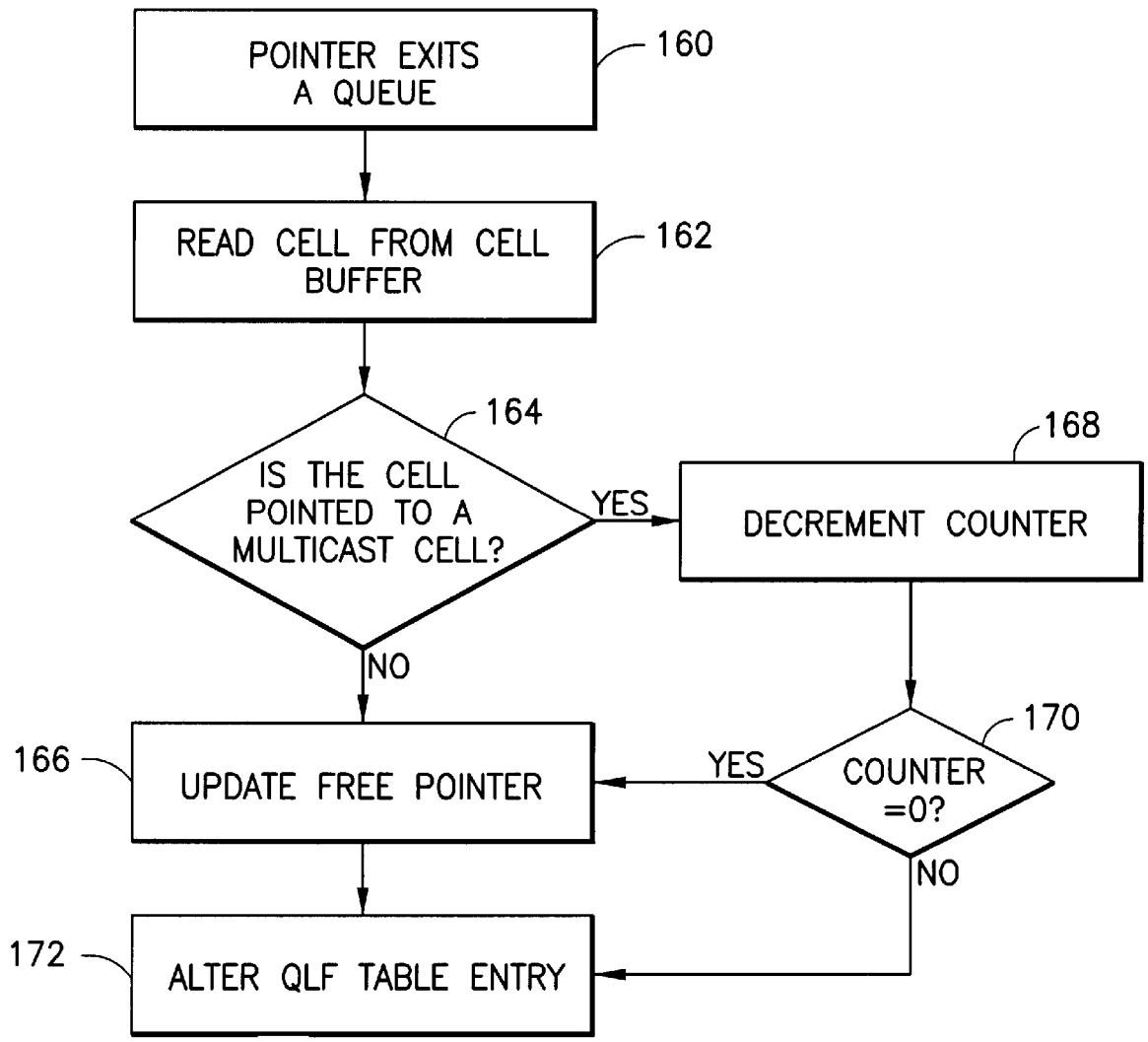
FIG. 10 is a simplified flow chart illustrating the handling of outgoing cells according to the invention.
Figure 11:
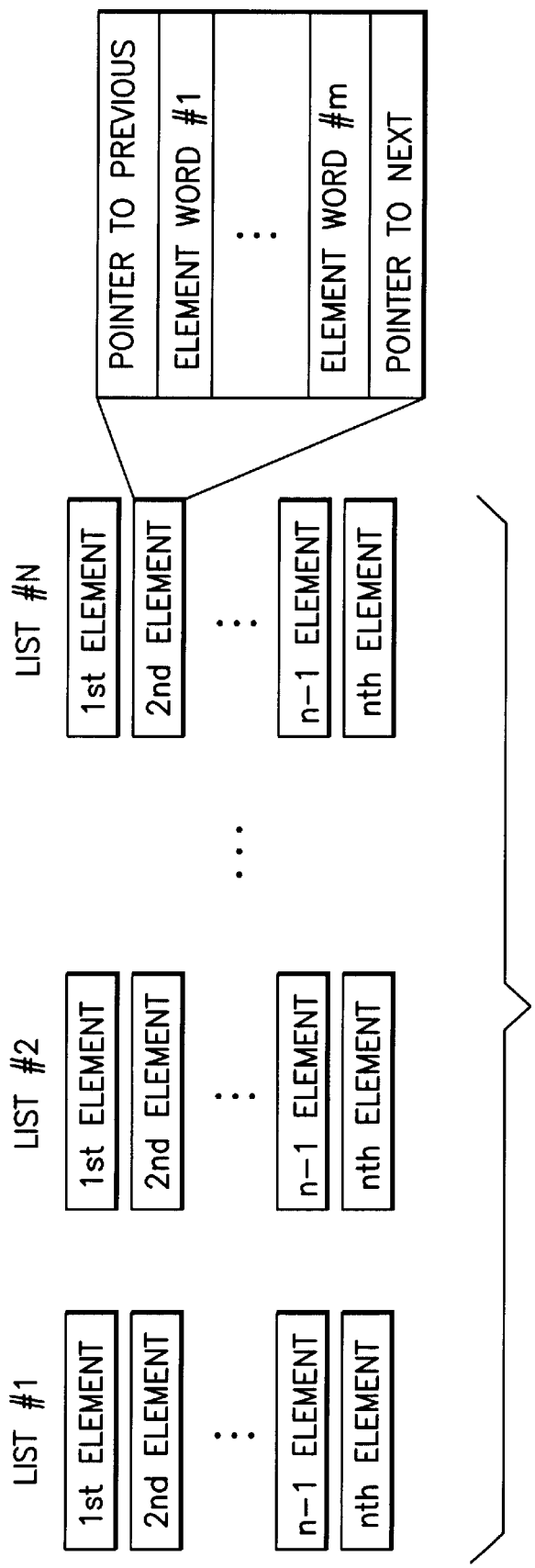
FIG. 11 is a schematic diagram of link list FIFOs in shared RAM.
Figure 12:
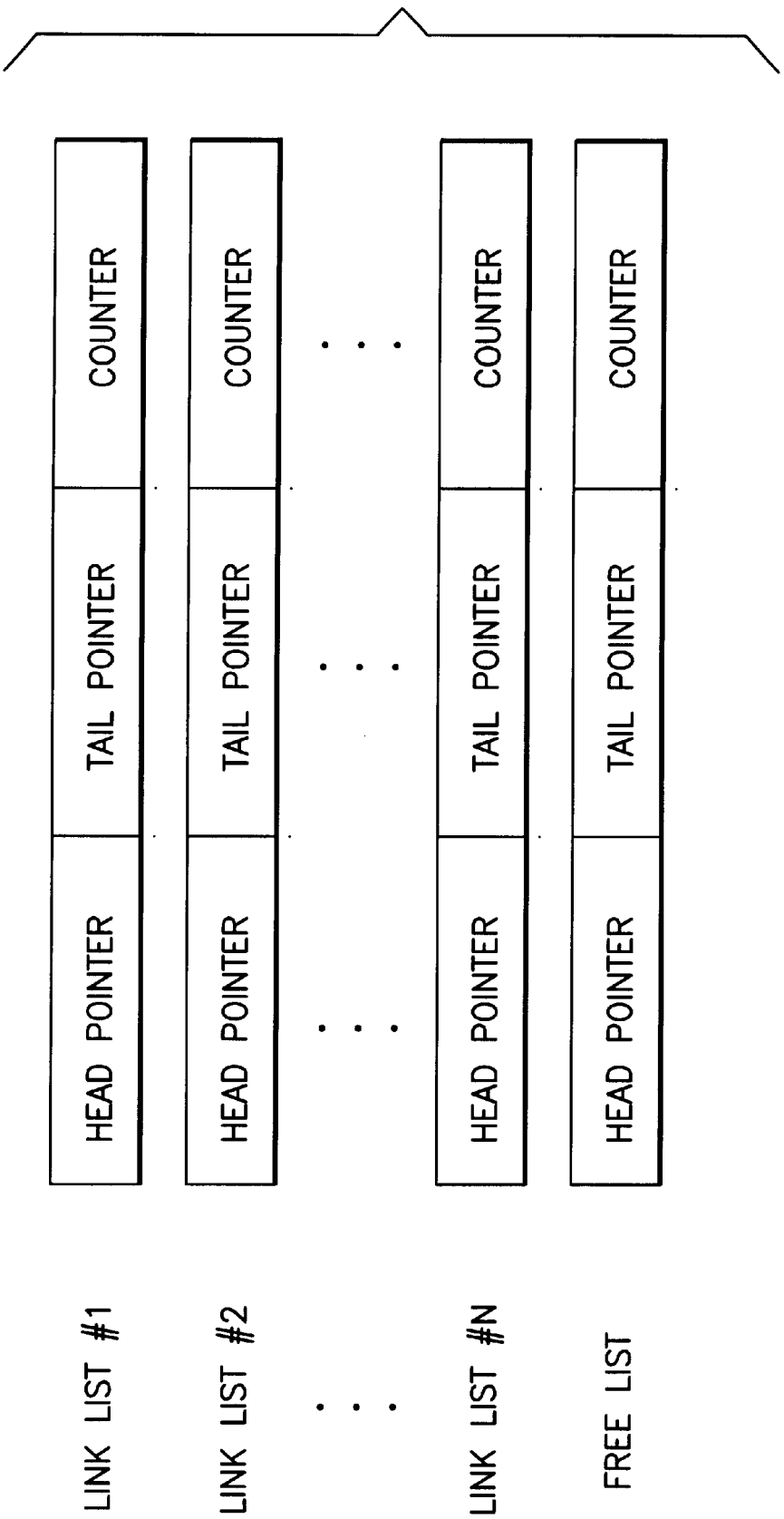
FIG. 12 is a schematic diagram of management RAM for managing the link list FIFOs of FIG. 11.

The processing of cells exiting the queue system of the invention is illustrated in FIG. 10. When a path becomes available to the destination of a queue, the first pointer from the queue associated with that destination is popped from the queue at 160 in a FIFO manner. The pointer is read to find the memory location of the cell and the cell is read from shared RAM at 162. From the cell header, it is determined at 164 whether the cell is a multicast cell. If it is not, the cell is sent to the destination and the free pointer is updated at 166 to indicate that the block of RAM where the cell had been stored is now available. After the free pointer is updated, at 172 the QLF table entry (FIG. 6) for this queue is altered. In particular, the cell count is decremented and the head pointer is changed to point to the next cell pointer (next pointer in FIG. 6).

Returning to 164, if it is determined that the cell is a multicast cell, the counter attached to the cell (the last word in the block shown in FIG. 5) is decremented at 168 after the cell is sent to its destination. If, as determined at 170, the counter now is equal to zero, the free pointer is updated at 166 as described above. If the counter is not equal to zero, a copy of the cell remains at the same location in shared RAM because pointers in other queues are pointing to it. The QLF table entry for this particular queue is nevertheless altered at 172 in the manner described above to reflect that this queue has a new starting point and one fewer cell.

There have been described and illustrated herein methods for managing multiple ATM cell queues in a shared RAM while providing efficient means for multicasting cells and an apparatus for performing these methods. While particular embodiments of the invention have been described, it is not intended that the invention be limited thereto, as it is intended that the invention be as broad in scope as the art will allow and that the specification be read likewise. Thus, while particular memory block sizes have been disclosed, it will be appreciated that other block sizes could be utilized while sacrificing some of the benefits of the invention but still retaining most of the benefits of the invention. Also, while particular formats for table entries have been shown, it will be recognized that other formats could be used with similar results obtained. Moreover, while particular method steps have been disclosed in reference to the flow charts, it will be appreciated that additional method steps may be required to carry on the invention depending on the hardware used and other parameters understood by those skilled in the art. Furthermore, while the flow charts illustrate that method steps are carried out in a particular order, it will be appreciated that the order of some method steps may be considered arbitrary, that the order of some steps may be varied without adverse results, that the order of some method steps may be varied provided that other modifications are made, and that the essential steps of the invention are not to be limited by the order in which they are carried out. In addition, while the invention was described with respect to ATM cells, it will be appreciated that the apparatus and methods of the could be used with respect to other the storage of other types of data. Further yet, while particular circuitry and flow charts relating to software were shown and described, it will be appreciated that other circuitry and/or software could be utilized to accomplish the management of data according to the principles of the invention. It will therefore be appreciated by those skilled in the art that yet other modifications could be made to the provided invention without deviating from its spirit and scope as so claimed.

What is claimed is:

1. A method utilizing a management memory for managing queues of received data in a shared memory, said method comprising:

a) receiving data as a plurality of packets representing a plurality of data queues;

b) writing each packet to a location in shared memory;

c) for each packet written to a location in shared memory, creating at least one pointer to the location containing the packet;

d) based on the data queue to which a packet belongs, storing said at least one pointer as part of at least one queue of pointers at a location in shared memory, said queue of pointers corresponding to a particular data queue;

e) for each queue of pointers, storing information in the management memory, the information including a head pointer to the location in shared memory containing the pointer to the location in shared memory containing the received data to be first out, wherein the pointers for groups of packets in a gueue are stored in contiguous groups with a pointer to the next contiguous group of pointers, the pointers being stored in the order in which the packets will exit the queue.

2. Method according to claim 1, wherein:
the packets are ATM cells.

3. Method according to claim 2, wherein:
each of the locations in shared memory is a sixty-four byte block.

4. Method according to claim 1, further comprising:

f) for each packet which is multicast to multiple destinations, storing multiple copies of the pointers to the location containing the multicast packet, the number of pointers equaling the number of destinations, wherein said step of writing each packet to a location in shared memory includes, for each multicast packet, writing a count with the packet, the count representing the number of destinations.

5. Method according to claim 1, wherein:
the information includes a tail pointer to the location in shared memory containing the pointer to the location in shared memory containing the received data to be last out.

6. Method according to claim 1, wherein:
the information includes a count of the number of pointers in the queue.

7. Method according to claim 4, further comprising:

g) for each multicast session, writing a list of queue identifiers to identify each queue associated with the multicast session.

8. Method according to claim 7, wherein:

the list of queue identifiers is written in the management memory.

9. Method according to claim 1, further comprising:

f) maintaining a pointer in management memory which points to the next free location in shared memory.

10. A method utilizing a shared memory having a plurality of data storage locations and a management memory for managing multiple queues of received data, said method comprising:

a) forwarding received data to desired of the plurality of data storage locations in the shared memory;

b) creating a pointer to each of the data storage locations containing received data;

c) storing the pointers in a plurality of queues; and d) storing information regarding the pointer queues in the management memory, the information including a head pointer for each pointer queue, the head pointer pointing to the data storage location of the pointer pointing to the data storage location containing the received data which is first out of the queue, wherein
the pointers are stored in contiguous groups with a pointer to the next contiguous group of pointers.

11. Method according to claim 10, wherein:

the received data consists of ATM cells.

12. Method according to claim 11, wherein:

the data storage locations consist of a plurality of sixty-four byte blocks.

13. Method according to claim 10, further comprising:

e) for multicast data creating multiple pointers to the data storage location containing multicast data; and f) storing the multiple pointers in multiple queues.

14. Method according to claim 10, wherein:

the information includes a tail pointer pointing to the data storage location of the pointer pointing to the data storage location containing the received data which is last out of the queue.

15. Method according to claim 10, wherein:

the information includes a count of the pointers in the queue.

16. Method according to claim 13, further comprising:

g) for each multicast session, maintaining a list of the pointer queues associated with the multicast session.

17. Method according to claim 16, wherein:

the list of the pointer queues associated with the multicast session is maintained in management memory.

18. Method according to claim 10, further comprising:

e) maintaining a pointer to the next free data storage location.

19. Apparatus for managing multiple queues of received data, comprising:

a) a shared memory means having a plurality of data storage locations;

b) control means for receiving data and forwarding said received data to data storage locations in said shared memory means, for creating a pointer to each of said data storage locations in which received data is stored, and for storing pointers in pointer queues in said shared memory, said pointer queues corresponding to said multiple queues of received data, the pointers being stored in contiguous groups with a pointer to the next contiguous group of pointers; and c) management memory means for storing information regarding said pointer queues, said information including a head pointer for each pointer queue, said head pointer pointing to the data storage location of the pointer pointing to the data storage location containing the received data which is first out of the queue of received data.

20. Apparatus according to claim 18, wherein:

said received data is ATM cells.

21. Apparatus according to claim 20, wherein:

said data storage locations include a plurality of sixty-four byte blocks.

22. Apparatus according to claim 19, wherein:

said control means includes means for creating multiple pointers to each of said data storage locations in which multicast data is stored.

23. Apparatus according to claim 19, wherein:

said information includes a tail pointer for each pointer queue, said tail pointer pointing to the data storage location of the pointer pointing to the data storage location containing the received data which is last out of the queue of received data.

24. Apparatus according to claim 19, wherein:

said information includes a count of the number of pointers in the pointer queue.

25. Apparatus according to claim 22, wherein:

said control means includes means for maintaining a queue list for each multicast session, said queue list containing a list of all of the pointer queues associated with the multicast session.

26. Apparatus according to claim 19, wherein:

said control means includes means for maintaining a pointer to the next free one of said data storage locations.

* * * * *

UNITED STATES PATENT AND TRADEMARK OFFICE
CERTIFICATE OF CORRECTION

| | |
|---|---|
| PATENT NO. | : 6,246,682 B1 |
| APPLICATION NO. | : 09/263289 |
| DATED | : June 12, 2001 |
| INVENTOR(S) | : Subhash C. Roy et al. |

It is certified that error appears in the above-identified patent and that said Letters Patent is hereby corrected as shown below:

Col. 8, line 36 "gueue" should read "queue"

Col. 10, line 23 change "...according to claim 18..." to "...according to claim 19..."

Signed and Sealed this

Sixteenth Day of June, 2009

JOHN DOLL
*Acting Director of the United States Patent and Trademark Office*